United States Patent Office 3,310,544
Patented Mar. 21, 1967

3,310,544
ARRESTING CHLOROPRENE POLYMERIZATION
Charles E. Aho, Louisville, Ky., assignor to E. I. du Pont de Nemours and Company, Wilmington, Del., a corporation of Delaware
No Drawing. Filed Aug. 12, 1963, Ser. No. 301,637
5 Claims. (Cl. 260—92.3)

This invention relates to a novel method of terminating a chloroprene polymerization reaction.

In the polymerization of chloroprene adequate control of the properties of the plastic products depends on the almost complete stopping of the polymerization at the desired predetermined point, since further polymerization past the desired point even to the extent of less than 2% substantially alters these properties particularly the working properties such as plasticity. In the process of polymerization of chloroprene in the presence of sulfur followed by a plasticizing step to which process the present invention relates this stopping is particularly important. Unless polymerization can be almost completely stopped, the product will vary in essential properties because of further polymerization taking place to a variable extent during the plasticizing step and because of unavoidable delays of varying length which sometimes occur before the unpolymerized chloroprene can be removed.

Some agents are already known which effectively stop the polymerization of chloroprene but have the great disadvantage of contributing strong color or odor to the product. The tetraalkyl thiuram disulfides, which are added as plasticizing agents for the chloroprene polymers which have been made in the presence of sulfur are also somewhat effective in stopping the polymerization but allow an undesirable amount of further polymerization to take place before the chloroprene is removed with the disadvantages described above. In order to be useful for stopping polymerization in this process in which chloroprene is polymerized in the presence of sulfur and then plasticized by a tetraalkyl thiuram disulfide the "short-stopping" agent must be effective in the presence of these disulfides.

It is an object of this invention to provide a novel method for terminating the polymerization of chloroprene in the presence of sulfur. A further object is to provide polychloroprene with working properties which are predictable from the exact degree of polymerization of the chloroprene and which is free from undesirable color and odor. Another object is to provide a method for terminating the polymerization reaction which does not interfere with the plasticizing agents for the polychloroprene. Other objects will appear hereinafter.

These and other objects are accomplished by an improvement to the process of polymerizing chloroprene in an alkaline emulsion in the presence of sulfur and a polymerization catalyst, followed by the addition of plasticizing agents which slowly terminate the reaction and render the polychloroprene easily processed by conventional rubber-working machinery. The improvement comprises incorporating in the emulsion, after the desired degree of polymerizaiton has been obtained, about 0.01 to 0.10 percent by weight of the chloroprene of 4,4'-thiobis(6-tertiary butyl orthocresol).

The process of making plastic polymers of chloroprene to which the present invention relates is described in general terms in U.S. 2,234,215 and 2,264,173. In carrying out this invention, there may be used either chloroprene or a mixture of chloroprene with a minor amount (less than 50% of the total) of another ethylenically unsaturated compound polymerizable therewith, such as styrene, methyl methacrylate, butadiene, or a 2,3-dichlorobutadiene. It is to be understood that the terms "polymers of chloroprene" and "polymerization of chloroprene" as used herein include such copolymers and their formation.

Suitable emulsifying agents for these monomers are the sodium, potassium, ammonium, or other water-soluble salts of long-chain or polynuclear carboxylic acids, such as oleic, stearic, abietic, and those made by hydrogenation or disproportionation of rosin acids. Particularly when the dispersion is to be acidified without coagulation, acid-stable dispersing agents such as the water-soluble sulfonates of long-chain or polynuclear hydrocarbon are also used.

The sulfur used will ordinarily be 0.25 to 2.0% of the monomer used, depending on the plasticity desired. Suitable catalysts are organic and inorganic peroxy compounds such as benzoyl peroxide, perbenzoic acid, and sodium persulfate.

The plasticizing agents added to the alkaline dispersions in carrying out the present invention are tetrasubstituted thiuram disulfides and in addition it is also preferable to use the water-soluble disubstituted dithiocarbamates along with the disulfides in both of which the substituting groups are aliphatic, either alkyl or polymethylene. Thus compounds in which two nitrogen valances are satisfied by a divalent aliphatic radical, as in dipentamethylene thiuram disulfide, are included as well as tetramethyl, tetraethyl, tetrabutyl, and tetraoctyl thiuram disulfides and the corresponding disubstituted dithiocarbamates. Preferably 0.3 to 0.6 part of the thiuram disulfide and up to 0.65 part of the dithiocarbamate are used (based upon 100 parts of chloroprene).

In addition to the thiuram disulfide and dithiocarbamate, a small amount of an alkali sulfite may also be added to supplement their action. If desired, the alkali sulfite can be used to replace all or part of the dithiocarbamates or part of the thiuram disulfides. As a result, the same plasticity may be reached with smaller quantities of these sulfur compounds. Representative alkali sulfites are sodium, potassium or ammonium sulfite or bisulfites. Their use for this purpose is the subject of my copending application Ser. No. 20,005, filed Apr. 5, 1960, now U.S. Patent 3,105,055.

For further details of all phases of the process, reference is made to U.S. 2,234,215 and 2,264,173, referred to above.

The amount required of the novel arresting agent is very small, 0.01 to 0.10 part per 100 parts of chloroprene employed. The preferred amount is about 0.015 to 0.025. It is usually added when 70 to 95% of the chloroprene has polymerized. It is effective at all temperatures commonly used in the polymerization of chloroprene, within the range of 0° to 100° C. but is more effective at the lower temperatures and is preferably used at 20 to 40° C. In the preferred embodiment, the polymer dispersion is cooled and then held at 25° C.

The polychloroprene prepared by this invention has in general the physical properties, both cured and uncured, of natural rubber and hence may be used wherever natural rubber is used. In addition, however, it is greatly superior to natural rubber in resistance to swelling in hydrocarbons, to oxidation and other chemical attack, and to to diffusion of gases and hence finds great application in the many situations where these properties, combined with the general excellency of natural rubber, are required.

The following example will better illustrate the nature of the present invention; however, the invention is not intended to be limited to this example. Parts are by weight unless otherwise indicated.

*Example*

The polymer dispersion to be treated is made according to the general procedure of U.S. 2,264,173 by emulsifying 100 parts by weight of chloroprene, containing in solution 0.6 part of sulfur and 4 parts of wood rosin, in a solution in 122.5 parts of water of 0.75 part of sodium hydroxide and 0.5 part of the sodium salts of the condensation product of naphthalene sulfonic acids with formaldehyde, serving as the acid-stable dispersing agent. The sodium hydroxide in one phase reacts with the rosin in the other, forming sodium salts which act as the main emulsifying agent. The emulsified chloroprene is then polymerized at 40° C. by adding as catalyst, a solution of 0.50 part of potassium persulfate and 0.025 part of the sodium salt of anthraquinone beta-sulfonic acid in 9.47 parts of water. Part of this is added at the start and part during the course of the polymerization, to maintain a fairly uniform rate of polymerization. The course of the polymerization is followed by determining the specific gravity of the dispersion. When this reaches 1.072 at 40° C., corresponding to 90% conversion to polymer, the reaction is "short-stopped" by adding 0.02 part of 4,4'-thiobis(6-tertiary butyl orthocresol) and 0.45 part of tetraethyl thiuram disulfide dissolved in 2.95 parts of toluene dispersed in 2.22 parts of water by means of 0.30 part of the sodium salts of the condensation product of naphthalene sulfonic acids with formaldehyde. The dispersion is rapidly cooled to 30° C. and 0.37 part of sodium dibutyl dithiocarbamate dissolved in water is then added, with further cooling to 25° C. and kept at this temperature for 4 hours, during which time plasticizing of the dispersed polymer takes place. The total polymerization *after* the addition of the 4,4'-thiobis(6-tertiary butyl orthocresol) is only 0.2 to 0.3% in carefully controlled laboratory experiments and no greater than 0.9% in plant scale operation. When only the tetraethyl thiuram disulfide and sodium dibutyl dithiocarbamate are used to arrest the reaction, the further polymerization is 5 to 10% under plant conditions.

The polymer is finally isolated by removing the unchanged chloroprene by steam distillation at reduced pressure in a tube under conditions of turbannular flow as described in U.S. 2,467,769, followed by the addition of 1.6 parts of tetraethyl thiuram disulfide, dispersed in water as above, acidification with dilute acetic acid to pH 5.8, and coagulation by freezing in thin layers as described in U.S. 2,187,146 and then washing and drying. The thiuram disulfide acts as a stabilizer. The isolated product of this example is identical in working and curing properties, stability, properties of its vulcanizates, color, and odor, with a similar product made without the novel "short-stopping" compound of this invention, but prepared by selecting the point at which the thiuram disulfide is added so that the total polymerization before and after is 90%.

Many closely related phenols have been tested for their ability to arrest polymerization as in the present invention, but all are less effective or discolor badly. In the latter class are hydroquinone and p-tertiarybutyl catechol. Compounds in the first class are ditertiarybutyl hydroquinone, 4,4'-methylene bis(2,6-ditertiarybutyl phenol), 2,6-ditertiarybutyl-alpha-methylamino p-cresol and 4,4'-thiobis(6-tertiarybutyl m-cresol).

As many widely different embodiments of this invention may be made without departing from the spirit and scope thereof, it is to be understood that this invention is not limited to the specific embodiments thereof except as defined in the appended claims.

What is claimed is:

1. In the process for polymerizing chloroprene in an alkaline emulsion in the presence of sulfur and an organic or inorganic peroxy compound catalyst and adding a plasticizer to the emulsion containing the polymerized chloroprene, the improvement which comprises incorporating in said emulsion, upon obtaining the desired degree of polymerization, about 0.01 to 0.10% by weight of the chloroprene of 4,4'-thiobis-(6-tertiary butyl orthocresol).

2. A process as defined in claim 1 where said catalyst is selected from the group consisting of benzoyl peroxide, perbenzoic acid, and sodium persulfate and the amount of said 4,4'-thiobis(6-tertiary butyl orthocresol) is about 0.015 to 0.025% by weight of said chloroprene.

3. In the process for polymerizing chloroprene in an alkaline emulsion in the presence of sulfur and an organic or inorganic peroxy compound catalyst and adding a tetraalkyl thiuram disulfide and an alkali sulfite to the emulsion containing the polymerized chloroprene the improvement which comprises incorporating in said emulsion, upon obtaining the desired degree of polymerization, about 0.01 to 0.10% by weight of the chloroprene of 4,4'-thiobis(6-tertiary butyl orthocresol).

4. In the process for polymerizing chloroprene in an alkaline emulsion in the presence of sulfur and an organic or inorganic peroxy compound catalyst and adding a tetraalkyl thiuram disulfide, a dialkyl dithiocarbamate and an alkali sulfite to the emulsion containing the polymerized chloroprene the improvement which comprises incorporating in said emulsion, upon obtaining the desired degree of polymerization, about 0.01 to 0.10% by weight of the chloroprene of 4,4'-thiobis (6-tertiary butyl orthocresol).

5. In the process for polymerizing chloroprene in an alkaline emulsion in the presence of sulfur and an organic or inorganic peroxy compound catalyst and adding tetraethyl thiuram disulfide and sodium dibutyl dithiocarbamate to the emulsion containing the polymerized chloroprene the improvement which comprises incorporating in said emulsion, upon obtaining the desired degree of polymerization, about 0.01 to 0.10% by weight of the chloroprene of 4,4'-thiobis(6-tertiary butyl orthocresol).

No references cited.

JOSEPH L. SCHOFER, *Primary Examiner.*

H. I. CANTOR, *Assistant Examiner.*